(12) United States Patent
Keshavan et al.

(10) Patent No.: US 10,332,555 B1
(45) Date of Patent: Jun. 25, 2019

(54) REDUCING VIBRATION TRANSMISSION IN A DUAL ACTUATOR DISK DRIVE UTILIZING A SINGLE PIVOT SHAFT

(71) Applicant: Western Digital Technologies, Inc., San Jose, CA (US)

(72) Inventors: Manoj Keshavan, San Jose, CA (US); Jung-Seo Park, San Jose, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 15/616,136

(22) Filed: Jun. 7, 2017

(51) Int. Cl.
  *G11B 5/55* (2006.01)
  *G11B 19/20* (2006.01)
  *G11B 25/04* (2006.01)
  *G11B 33/12* (2006.01)
  *G11B 5/596* (2006.01)
  *G11B 5/48* (2006.01)
  *F16C 35/067* (2006.01)
  *G11B 21/02* (2006.01)
  *F16C 35/063* (2006.01)
  *F16C 19/54* (2006.01)

(52) U.S. Cl.
  CPC ........ *G11B 19/2018* (2013.01); *G11B 5/4813* (2013.01); *G11B 5/5521* (2013.01); *G11B 5/5578* (2013.01); *G11B 5/5586* (2013.01); *G11B 5/59627* (2013.01); *G11B 25/04* (2013.01); *G11B 33/124* (2013.01); *F16C 19/54* (2013.01); *F16C 35/063* (2013.01); *F16C 35/067* (2013.01); *F16C 2370/12* (2013.01); *G11B 21/02* (2013.01)

(58) Field of Classification Search
  None
  See application file for complete search history.

(56) References Cited

U.S. PATENT DOCUMENTS

| 4,544,972 A | * | 10/1985 | Kogure | G11B 5/5521 360/246.7 |
|---|---|---|---|---|
| 4,629,919 A | * | 12/1986 | Merkle | F16C 25/08 310/67 R |
| 4,698,709 A | * | 10/1987 | Ihlenburg | G11B 5/5521 360/265.6 |
| 4,879,617 A | * | 11/1989 | Sampietro | G11B 5/54 360/265 |
| 5,666,242 A | * | 9/1997 | Edwards | F16C 27/066 360/265.6 |

(Continued)

OTHER PUBLICATIONS

Dual Actuator tuned mass damper pivot bearing, IP.com database, original publication date: Feb. 1, 2000, included in prior art database: Jun. 18, 2003, 2 pages, IP.com disclosure No. IPCOM000013589D, IP.com I, LLC.

Primary Examiner — William J Klimowicz
(74) Attorney, Agent, or Firm — John D. Henkhaus

(57) ABSTRACT

An actuator pivot shaft assembly for a multi-actuator data storage device may include one or more annular grooves extending radially inward from an outer surface of the pivot shaft, thereby desirably weakening or structurally decoupling the shaft between the actuators, to assist with inhibiting transmission of vibration between the actuators during operation. The shaft assembly may further include an elastomeric damper positioned within the annular groove(s), to damp transmission of vibrational forces between the actuators through the shared shaft.

20 Claims, 7 Drawing Sheets

(56) References Cited

U.S. PATENT DOCUMENTS

| | | | |
|---|---|---|---|
| 5,675,456 A * | 10/1997 | Myers | F16C 27/04 360/265.6 |
| 5,727,882 A * | 3/1998 | Butler | F16C 27/066 384/536 |
| 5,761,007 A * | 6/1998 | Price | G11B 5/4813 360/264.4 |
| 5,805,386 A * | 9/1998 | Faris | G11B 5/4813 360/264.4 |
| 5,914,837 A * | 6/1999 | Edwards | F16C 27/066 360/265.6 |
| 5,920,441 A | 7/1999 | Cunningham et al. | |
| 5,930,071 A * | 7/1999 | Back | G11B 19/2018 360/265.2 |
| 5,983,485 A * | 11/1999 | Misso | F16O 27/04 29/603.03 |
| 6,005,743 A | 12/1999 | Price et al. | |
| 6,018,441 A * | 1/2000 | Wu | G11B 5/5521 360/265.6 |
| 6,191,924 B1 * | 2/2001 | Koester | G11B 5/4813 360/250 |
| 6,449,130 B1 * | 9/2002 | Koyama | G11B 5/4813 360/264.4 |
| 6,480,363 B1 * | 11/2002 | Prater | F16C 27/04 360/265.7 |
| 6,490,138 B1 * | 12/2002 | Prater | G11B 5/5521 360/294.3 |
| 6,560,075 B2 * | 5/2003 | Price | G11B 5/4813 360/246.7 |
| 6,603,640 B1 | 8/2003 | Prater et al. | |
| 6,618,226 B2 * | 9/2003 | Prater | G11B 5/4813 360/265.7 |
| 6,687,092 B2 * | 2/2004 | Kan | F16C 19/54 360/264.4 |
| 6,747,836 B2 | 6/2004 | Stevens et al. | |
| 6,847,504 B1 | 1/2005 | Bennett et al. | |
| 6,961,212 B1 | 11/2005 | Gustafson et al. | |
| 7,469,463 B2 | 12/2008 | Prater et al. | |
| 7,513,030 B2 | 4/2009 | Aoyagi et al. | |
| 2002/0039259 A1 * | 4/2002 | Koyama | G11B 5/4813 360/264.4 |
| 2002/0149884 A1 | 10/2002 | Price et al. | |
| 2004/0095672 A1 | 5/2004 | Price | |
| 2006/0119988 A1 * | 6/2006 | Tsang | G11B 5/4813 360/265.2 |
| 2007/0268630 A1 * | 11/2007 | Fisher | G11B 5/5526 360/265.2 |

\* cited by examiner

REDUCING VIBRATION TRANSMISSION IN A DUAL ACTUATOR DISK DRIVE UTILIZING A SINGLE PIVOT SHAFT

FIELD OF EMBODIMENTS

Embodiments of the invention may relate generally to data storage devices such as hard disk drives, and particularly to managing transmission of vibration in a dual-actuator disk drive utilizing a single pivot shaft.

BACKGROUND

A hard disk drive (HDD) is a non-volatile storage device that is housed in a protective enclosure and stores digitally encoded data on one or more circular disks having magnetic surfaces. When an HDD is in operation, each magnetic-recording disk is rapidly rotated by a spindle system. Data is read from and written to a magnetic-recording disk using a read-write head that is positioned over a specific location of a disk by an actuator. A read-write head makes use of magnetic fields to write data to, and read data from the surface of a magnetic-recording disk. A write head works by using the current flowing through its coil to produce a magnetic field. Electrical pulses are sent to the write head, with different patterns of positive and negative currents. The current in the coil of the write head produces a localized magnetic field across the gap between the head and the magnetic disk, which in turn magnetizes a small area on the recording medium.

Increasing areal density (a measure of the quantity of information bits that can be stored on a given area of disk surface) is one of the on-going goals of hard disk drive technology evolution. In one form, this goal manifests in the type of high-capacity HDDs that are especially attractive in the context of enterprise, cloud computing/storage, and data center environments. However, the performance of high-capacity HDDs has not necessarily scaled up commensurately with the increases in capacity. This has led to the necessary development and implementation of various means for increasing HDD performance.

Any approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

Embodiments are illustrated by way of example, and not by way of limitation, in the figures of the accompanying drawings and in which like reference numerals refer to similar elements and in which.

DETAILED DESCRIPTION

Generally, approaches to managing vibration associated with a dual-actuator pivot shaft are described. In the following description, for the purposes of explanation, numerous specific details are set forth in order to provide a thorough understanding of the embodiments of the invention described herein. It will be apparent, however, that the embodiments of the invention described herein may be practiced without these specific details. In other instances, well-known structures and devices are shown in block diagram form in order to avoid unnecessarily obscuring the embodiments of the invention described herein.

Physical Description of an Illustrative Operating Context

Embodiments may be used in the context of a digital data storage device (DSD), such as a hard disk drive (HDD). Thus, in accordance with an embodiment, a plan view illustrating an HDD 100 is shown in FIG. 1 to illustrate an exemplary operating context.

Figure 1:
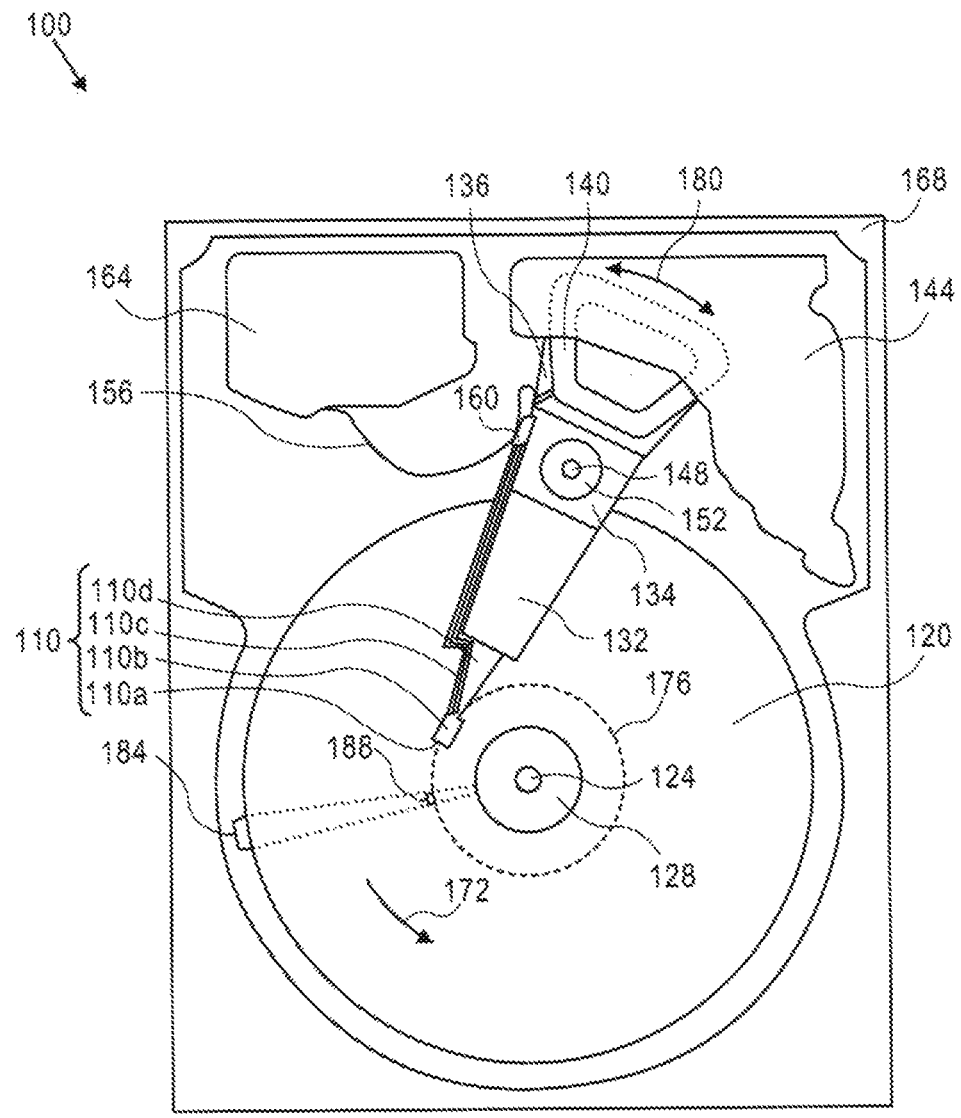
FIG. 1 is a plan view illustrating a hard disk drive (HDD), according to an embodiment.

FIG. 1 illustrates the functional arrangement of components of the HDD 100 including a slider 110*b* that includes a magnetic read-write head 110*a*. Collectively, slider 110*b* and head 110*a* may be referred to as a head slider. The HDD 100 includes at least one head gimbal assembly (HGA) 110 including the head slider, a lead suspension 110*c* attached to the head slider typically via a flexure, and a load beam 110*d* attached to the lead suspension 110*c*. The HDD 100 also includes at least one recording medium 120 rotatably mounted on a spindle 124 and a drive motor (not visible) attached to the spindle 124 for rotating the medium 120. The read-write head 110*a*, which may also be referred to as a transducer, includes a write element and a read element for respectively writing and reading information stored on the medium 120 of the HDD 100. The medium 120 or a plurality of disk media may be affixed to the spindle 124 with a disk clamp 128.

The HDD 100 further includes an arm 132 attached to the HGA 110, a carriage 134, a voice-coil motor (VCM) that includes an armature 136 including a voice coil 140 attached to the carriage 134 and a stator 144 including a voice-coil magnet (not visible). The armature 136 of the VCM is attached to the carriage 134 and is configured to move the arm 132 and the HGA 110 to access portions of the medium 120, all collectively mounted on a pivot shaft 148 with an interposed pivot bearing assembly 152. In the case of an HDD having multiple disks, the carriage 134 may be referred to as an "E-block," or comb, because the carriage is arranged to carry a ganged array of arms that gives it the appearance of a comb.

An assembly comprising a head gimbal assembly (e.g., HGA 110) including a flexure to which the head slider is coupled, an actuator arm (e.g., arm 132) and/or load beam to which the flexure is coupled, and an actuator (e.g., the VCM) to which the actuator arm is coupled, may be collectively referred to as a head stack assembly (HSA). An HSA may, however, include more or fewer components than those described. For example, an HSA may refer to an assembly that further includes electrical interconnection components. Generally, an HSA is the assembly configured to move the head slider to access portions of the medium 120 for read and write operations.

With further reference to FIG. 1, electrical signals (e.g., current to the voice coil 140 of the VCM) comprising a write signal to and a read signal from the head 110*a*, are transmitted by a flexible cable assembly (FCA) 156 (or "flex cable"). Interconnection between the flex cable 156 and the head 110*a* may include an arm-electronics (AE) module 160, which may have an on-board pre-amplifier for the read signal, as well as other read-channel and write-channel electronic components. The AE module 160 may be attached to the carriage 134 as shown. The flex cable 156 may be coupled to an electrical-connector block 164, which provides electrical communication, in some configurations, through an electrical feed-through provided by an HDD housing 168. The HDD housing 168 (or "enclosure base" or "baseplate" or simply "base"), in conjunction with an HDD cover, provides a semi-sealed (or hermetically sealed, in some configurations) protective enclosure for the information storage components of the HDD 100.

Other electronic components, including a disk controller and servo electronics including a digital-signal processor (DSP), provide electrical signals to the drive motor, the voice coil 140 of the VCM and the head 110*a* of the HGA 110. The electrical signal provided to the drive motor enables the drive motor to spin providing a torque to the spindle 124 which is in turn transmitted to the medium 120 that is affixed to the spindle 124. As a result, the medium 120 spins in a direction 172. The spinning medium 120 creates a cushion of air that acts as an air-bearing on which the air-bearing surface (ABS) of the slider 110*b* rides so that the slider 110*b* flies above the surface of the medium 120 without making contact with a thin magnetic-recording layer in which information is recorded. Similarly in an HDD in which a lighter-than-air gas is utilized, such as helium for a non-limiting example, the spinning medium 120 creates a cushion of gas that acts as a gas or fluid bearing on which the slider 110*b* rides.

The electrical signal provided to the voice coil 140 of the VCM enables the head 110*a* of the HGA 110 to access a track 176 on which information is recorded. Thus, the armature 136 of the VCM swings through an arc 180, which enables the head 110*a* of the HGA 110 to access various tracks on the medium 120. Information is stored on the medium 120 in a plurality of radially nested tracks arranged in sectors on the medium 120, such as sector 184. Correspondingly, each track is composed of a plurality of sectored track portions (or "track sector") such as sectored track portion 188. Each sectored track portion 188 may include recorded information, and a header containing error correction code information and a servo-burst-signal pattern, such as an ABCD-servo-burst-signal pattern, which is information that identifies the track 176. In accessing the track 176, the read element of the head 110*a* of the HGA 110 reads the servo-burst-signal pattern, which provides a position-error-signal (PES) to the servo electronics, which controls the electrical signal provided to the voice coil 140 of the VCM, thereby enabling the head 110*a* to follow the track 176. Upon finding the track 176 and identifying a particular sectored track portion 188, the head 110*a* either reads information from the track 176 or writes information to the track 176 depending on instructions received by the disk controller from an external agent, for example, a microprocessor of a computer system.

An HDD's electronic architecture comprises numerous electronic components for performing their respective functions for operation of an HDD, such as a hard disk controller ("HDC"), an interface controller, an arm electronics module, a data channel, a motor driver, a servo processor, buffer memory, etc. Two or more of such components may be combined on a single integrated circuit board referred to as a "system on a chip" ("SOC"). Several, if not all, of such electronic components are typically arranged on a printed circuit board that is coupled to the bottom side of an HDD, such as to HDD housing 168.

References herein to a hard disk drive, such as HDD 100 illustrated and described in reference to FIG. 1, may encompass an information storage device that is at times referred to as a "hybrid drive". A hybrid drive refers generally to a storage device having functionality of both a traditional HDD (see, e.g., HDD 100) combined with solid-state storage device (SSD) using non-volatile memory, such as flash or other solid-state (e.g., integrated circuits) memory, which is electrically erasable and programmable. As operation, management and control of the different types of storage media typically differ, the solid-state portion of a hybrid drive may include its own corresponding controller functionality, which may be integrated into a single controller along with the HDD functionality. A hybrid drive may be architected and configured to operate and to utilize the solid-state portion in a number of ways, such as, for non-limiting examples, by using the solid-state memory as cache memory, for storing frequently-accessed data, for storing I/O intensive data, and the like. Further, a hybrid drive may be architected and configured essentially as two storage devices in a single enclosure, i.e., a traditional HDD and an SSD, with either one or multiple interfaces for host connection.

Introduction

The term "substantially" will be understood to describe a feature that is largely or nearly structured, configured, dimensioned, etc., but with which manufacturing tolerances and the like may in practice result in a situation in which the structure, configuration, dimension, etc. is not always or necessarily precisely as stated. For example, describing a structure as "substantially vertical" would assign that term its plain meaning, such that the sidewall is vertical for all practical purposes but may not be precisely at 90 degrees.

Recall the observation that the performance of high-capacity HDDs has not seemed to scale up commensurately with the increases in data capacity. This phenomenon has reached the extent to which I/O (input/output) density may be a significant bottleneck standing in the way of widespread adoption of such HDDs. In other words, the high latencies of large capacity HDDs in a clustered environment, such as in data centers with multiple clustered nodes, may prohibit their widespread adoption. The pressure to increase the performance of high-capacity HDDs has become even stronger in view of the market penetration that solid-state storage continues to obtain.

One possible approach to increasing HDD performance is the implementation of multi-actuator systems, in which multiple independently operating actuators are assembled onto a single pivot shaft in order to concurrently read from multiple recording disks of a disk stack. However, the operation of multiple actuators on a shared pivot shaft can structurally couple the vibration modes of the actuators, leading to the transfer of vibrational energy between actuators by way of the shared shaft. That is, operation (i.e., rotary movement) of one actuator generates forces that transfer via the shared shaft to another actuator. This vibration transferred to the other actuator affects the ability of the corresponding read-write transducer (or "head") to efficiently arrive at and to stay on-track, resulting in undesirable track mis-registration ("TMR"). TMR inhibits the performance of HDDs in that an inordinate amount of time is expended trying to place and maintain the head well-centered over a track (e.g., via serving), such that corresponding read and write operations are effectively delayed, thus inhibiting overall I/O performance.

The number of actuators that may be assembled onto a single shared pivot shaft may vary from implementation to implementation; however, an exemplary but non-limiting dual-actuator arrangement is described throughout herein.

Dual-Actuator, Shared Shaft Decoupling

According to an embodiment, a technique for reducing vibration transmission from one actuator system to another in a dual-actuator, shared shaft arrangement is to decouple or isolate the two systems from each other. This may generally be achieved by reducing the stiffness of the shared shaft at the interface of the two actuators through the use of "soft or weak springs" as a decoupling mechanism, wherein the decoupling mechanism localizes the response primarily to the modes of the actuator being driven. Thus, the lower the stiffness of the decoupler, the lower the transmission of vibration energy from one actuator to the other. However, this approach may be burdened with undesirably excessive motion of the driven system, and places constraints on functionality and form-factor.

Figure 2A:
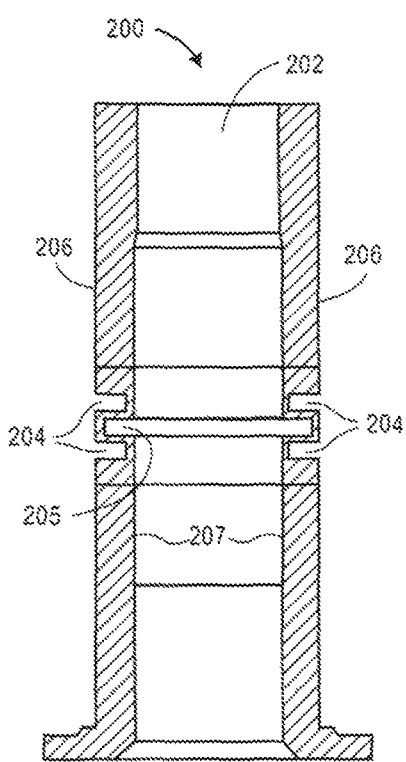
FIG. 2A is a cross-sectional side view illustrating a shared shaft, according to an embodiment.
Figure 2B:
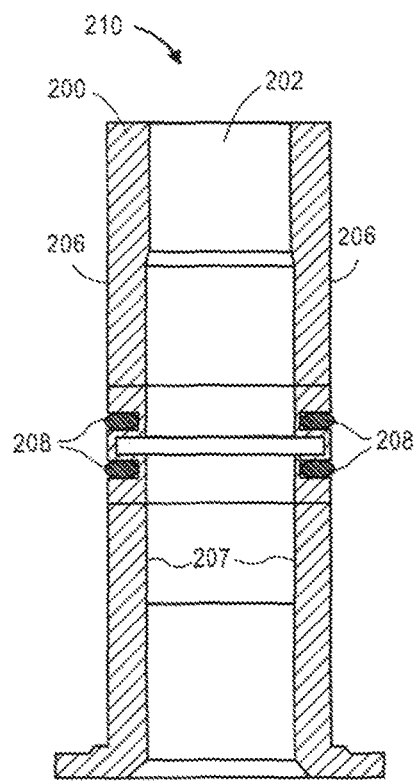
FIG. 2B is a cross-sectional side view illustrating a shared shaft with damper, according to an embodiment.

FIG. 2A is a cross-sectional side view illustrating a shared shaft, and FIG. 2B is a cross-sectional side view illustrating a shared shaft with damper, according to embodiments. The following features of a shaft 200 are described in more detail elsewhere herein, such as in conjunction with FIGS. 3A, 3B.

Shaft 200 comprises a bore 202 at least partially therethrough, and at least one annular groove 204 extending radially inward from an outer surface 206. For example, each annular groove 204 may be machined, cut or cast into the structure, or wall, of the shaft 200. FIG. 2A depicts shaft 200 with two exemplary annular grooves 204 however, the number of annular grooves 204 may vary from implementation to implementation. According to an embodiment, one or more of the annular grooves 204 circumscribes at least a portion of an outer perimeter of the shaft 200, such as an annular groove 204 machined from the outer surface 206 into the structure of the shaft 200. According to an embodiment, one or more of the annular grooves 204 circumscribes the entire outer perimeter of the shaft 200, i.e., such an annular groove 204 machined into the structure of the shaft 200 all the way around the outer diameter or perimeter of the shaft 200. Implementation of such structure-weakening annular grooves (possibly in conjunction with dampers as described elsewhere herein) reduces structural coupling between each side of the grooves, and provides damping of vibration transmitted across the grooves, while maintaining structural homogeneity of the shaft. In comparison, dual-actuator dual shaft designs may be separated by viscoelastic material at the interface between the shafts, which may creep and compromise the functionality of an HDD due to changes in actuator arm heights in relation to the disk surfaces, and are not likely to be as robust in the context of shock events.

According to an embodiment, a shaft such as shaft 200 comprises a plurality of annular grooves 204 (two, in this case), and an annular groove 205 that extends radially outward from an inner surface 207 of the shaft 200. According to embodiments, one or more annular groove 205 may circumscribe a portion of an inner perimeter of the shaft 200, such as an annular groove 205 machined from the inner surface 207 into the structure of the shaft 200, or may circumscribe the entire inner perimeter of the shaft 200. As depicted in FIG. 2A, each radially outward annular groove 205 may be positioned between a pair of radially inward annular grooves 204.

According to an embodiment, and as depicted in FIG. 2B, at least one, or possibly each, annular groove 204 is substantially filled with an elastomeric damper 208 positioned within or fitted therein, to form a shaft assembly 210. According to an embodiment, the elastomeric damper 208 comprises an elastomeric O-ring positioned, compressed, fitted within one or more annular groove 204. An appropriate elastomeric material may be selected based on, for non-limiting examples, desired damping characteristics over a desired frequency range and temperature range (e.g., based on loss factor), cleanliness requirements (e.g., considering outgassing), elasticity (e.g., based on shear modulus), and the like. Such an elastomeric damper 208 may serve to dissipate energy from deformation (e.g., bending) of the shaft 200 in response to operational vibrational forces and shock events, for example. Additionally, and according to an embodiment, implementations of a shaft 200 and/or a shaft assembly 210 may further comprise a lower bearing (see, e.g., lower bearing 304 of FIGS. 3A, 3B) having an inner race attached to the outer surface 206 of the shaft 200 at a first location, and/or an upper bearing (see, e.g., upper bearing 305 of FIGS. 3A, 3B) having an inner race attached to the outer surface 206 of the shaft 200 at a second location, depending on a desired manufacturing process associated with assembling a dual-actuator, shared shaft assembly.

Figure 3A:
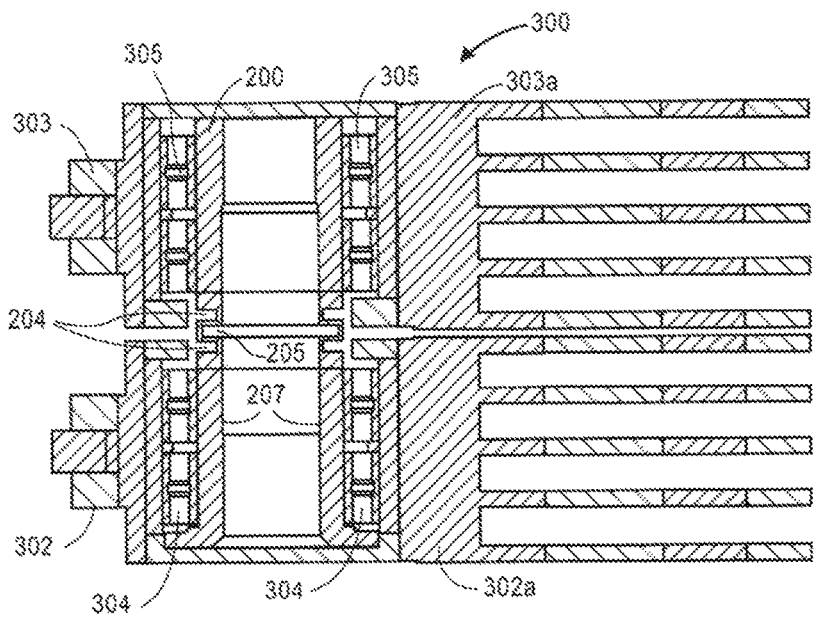
FIG. 3A is a cross-sectional side view illustrating the shared shaft of FIG. 2A with dual actuators assembled thereon, according to an embodiment.
Figure 3B:
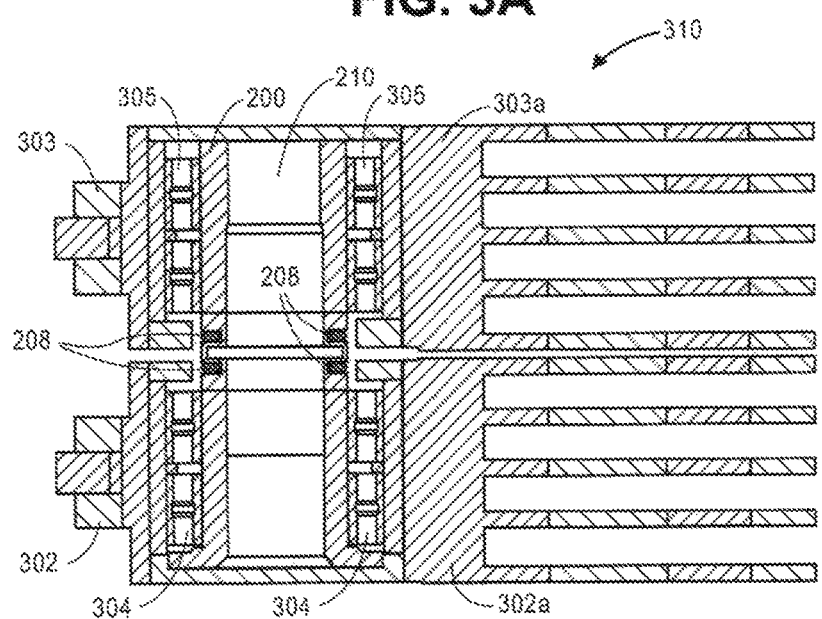
FIG. 3B is a cross-sectional side view illustrating the shared shaft of FIG. 2B with dual actuators assembled thereon, according to an embodiment.

FIG. 3A is a cross-sectional side view illustrating the shared shaft of FIG. 2A with dual actuators assembled thereon, and FIG. 3B is a cross-sectional side view illustrating the shared shaft of FIG. 2B with dual actuators assembled thereon, according to embodiments. With reference to FIGS. 3A, 3B, according to an embodiment, the shaft 200 (FIG. 3A) or the shaft assembly 210 (FIG. 3B) is utilized as a pivot shaft, or part of a pivot shaft assembly, for multiple actuators constituent to a multi-actuator, shared shaft data storage device such as a hard disk drive (HDD). As such, a multi-actuator, shared shaft actuator assembly 300 (or "dual-actuator assembly 300") of FIG. 3A comprises the shaft 200 (FIG. 2A), around which a first or lower rotary actuator 302 (including a carriage 302a, such as carriage 134 of FIG. 1) is rotatably coupled at a first location of shaft 200, with a lower bearing 304 interposed therebetween, and around which a second upper rotary actuator 303 (including a carriage 303a, such as carriage 134 of FIG. 1) is rotatably coupled at a second location of shaft 200, with an upper bearing 305 interposed therebetween. Note that the bearings (e.g., lower bearing 304 and upper bearing 305, and like bearings referenced herein) may be configured as bearing assemblies comprising multiple bearings (e.g., each bearing assembly may comprise two ball bearings). Similarly, a multi-actuator, shared shaft actuator assembly 310 (or "dual-actuator assembly 310") of FIG. 3B comprises the shaft assembly 210 (FIG. 2B) around which a first or lower rotary actuator 302 (including a carriage 302a) is rotatably coupled at a first location of shaft 200, with the lower bearing 304 interposed therebetween, and around which a second upper rotary actuator 303 (including a carriage 303a) is rotatably coupled at a second location of shaft 200, with the upper bearing 305 interposed there between.

With respect to dual-actuator assembly 300 and dual-actuator assembly 310, and according to an embodiment, it is notable that each annular groove(s) 204 (and annular groove 205, when present) of the shaft 200 is positioned between locations of the shaft at which each respective lower rotary actuator 302 and upper rotary actuator 303 is coupled. This is because a purpose of each annular groove 204 is to locally reduce the stiffness of the shaft 200, particularly at an interface area between the actuators 302, 303. This local structural weakening of the shaft 200 at the actuator interface functions to structurally decouple, or effectively isolate, the two actuator systems from each other, such as at the system resonance modes. Consequently, the level of vibrational forces that transmit from one actuator assembly to the other (e.g., during operation) would be expected to non-trivially diminish, in comparison with the vibrational forces that would otherwise transmit from one actuator assembly to the other through a pivot shaft that does not include annular grooves such as annular groove 204.

Further with respect to the dual-actuator assembly 310 of FIG. 3B, which comprises the shaft assembly 210 (FIG. 2B) which comprises the at least one damper 208, it is notable that each damper(s) 208 of the shaft assembly 210 is positioned between locations of the shaft at which each respective lower rotary actuator 302 and upper rotary actuator 303 is coupled, i.e., within a respective annular groove 204. This is because a purpose of each damper 208 is to dissipate vibrational energy at the actuator interface that may still transmit from one actuator assembly to the other despite the presence of annular grooves such as annular groove 204.

Dual-Actuator, Shared Shaft Assembly with Spacer

Figure 4A:
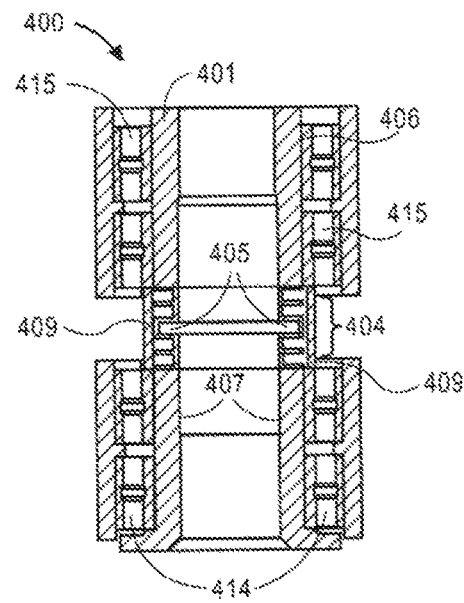
FIG. 4A is a cross-sectional side view illustrating a shared shaft, according to an embodiment.
Figure 4B:
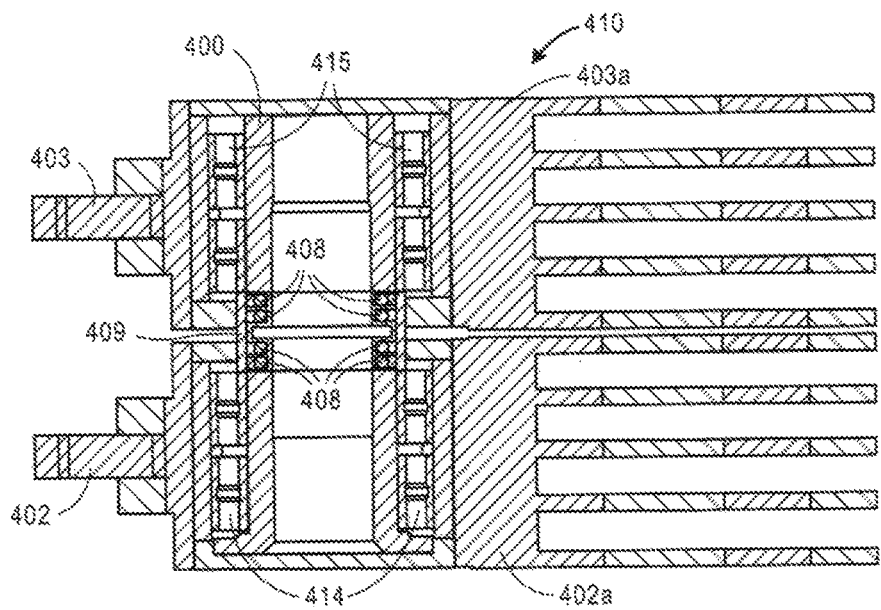
FIG. 4B is a cross-sectional side view illustrating the shared shaft of FIG. 4A with dual actuators assembled thereon, according to an embodiment.

FIG. 4A is a cross-sectional side view illustrating a shared shaft, and FIG. 4B is a cross-sectional side view illustrating the shared shaft of FIG. 4A with dual actuators assembled thereon, according to embodiments. Similar to shaft 200 (FIGS. 2A, 2B), pivot shaft assembly 400 (or "shaft assembly 400") comprises a shaft 401 having a bore at least partially therethrough, and at least one annular groove 404 extending radially inward from an outer surface 406. For example, each annular groove 404 may be machined, cut or cast into the structure, or wall, of the shaft 401. FIG. 4A depicts shaft 401 with four exemplary annular grooves 404 however, the number of annular groove(s) 404 may vary from implementation to implementation. According to embodiments, one or more of the annular grooves 404 may circumscribe a portion of an outer perimeter of the shaft 401, and/or one or more of the annular grooves 404 may circumscribe the entire outer perimeter of the shaft 401, i.e., such an annular groove 404 machined into the structure of the shaft 401 all the way around the outer diameter or perimeter of the shaft 401. Furthermore, a shaft such as shaft 401 may comprise a plurality of annular grooves 404 (four, in this case), and an annular groove 405 that extends radially outward from an inner surface 407 of the shaft 401, and may circumscribe a portion of or the entire inner perimeter of the shaft 401, such as an annular groove 405 machined from the inner surface 407 into the structure of the shaft 401. As depicted in FIG. 4A, each radially outward annular groove 405 may be positioned between radially inward annular grooves 404 or pairs of annular grooves 404.

According to an embodiment, and as depicted in FIG. 4B, at least one, or possibly each, annular groove 404 is substantially filled with an elastomeric damper 408 positioned within or fitted therein, such as an O-ring positioned or fitted within one or more annular groove 404. As before, an appropriate elastomer may be selected based on, for non-limiting examples, desired damping characteristics over a desired frequency range and temperature range, cleanliness requirements, elastic moduli, and the like. Additionally, and according to an embodiment, implementations of a shaft assembly 400 may further comprise a lower bearing 414 having an inner race attached to the outer surface 406 of the shaft 401 at a first location, and/or an upper bearing 415 having an inner race attached to the outer surface 406 of the shaft 401 at a second location, depending on a desired manufacturing process associated with assembling a dual-actuator, shared shaft assembly.

According to an embodiment, shaft assembly 400 further comprises an annular spacer 409 positioned over, around the shaft 401. Spacer 409 may assist with containing and mitigating the egress of contaminants from the annular groove 404/elastomeric damper 408 area of the shaft assembly 400, in particular, and from the hub area of the dual-actuator, shared shaft assembly, more generally.

With reference to FIG. 4B and according to an embodiment, the shaft assembly 400 (FIG. 4A) is utilized as a pivot shaft, or part of a pivot shaft assembly, for multiple actuators constituent to a multi-actuator, shared shaft data storage device such as a hard disk drive (HDD). As such, a multi-actuator, shared shaft actuator assembly 410 (or "dual-actuator assembly 410") of FIG. 4B comprises the shaft assembly 400, around which a first or lower rotary actuator 402 (including a carriage 402a, such as carriage 134 of FIG. 1) is rotatably coupled at a first location of the shaft 401, with the lower bearing 414 interposed there between, and around which a second upper rotary actuator 403 (including a carriage 403a, such as carriage 134 of FIG. 1) is rotatably coupled at a second location of shaft 401, with the upper bearing 415 interposed there between. As depicted in FIGS. 4A, 4B, spacer 409 is positioned between the lower and upper bearings 414, 415. With reference to FIG. 4B, the spacer 409 is likewise positioned between the lower and upper actuators 402, 403 of the dual-actuator assembly 410.

Figure 5A:
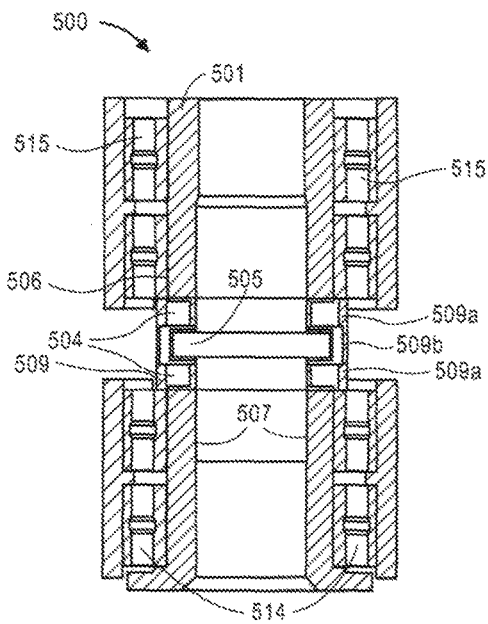
FIG. 5A is a cross-sectional side view illustrating a shared shaft, according to an embodiment.
Figure 5B:
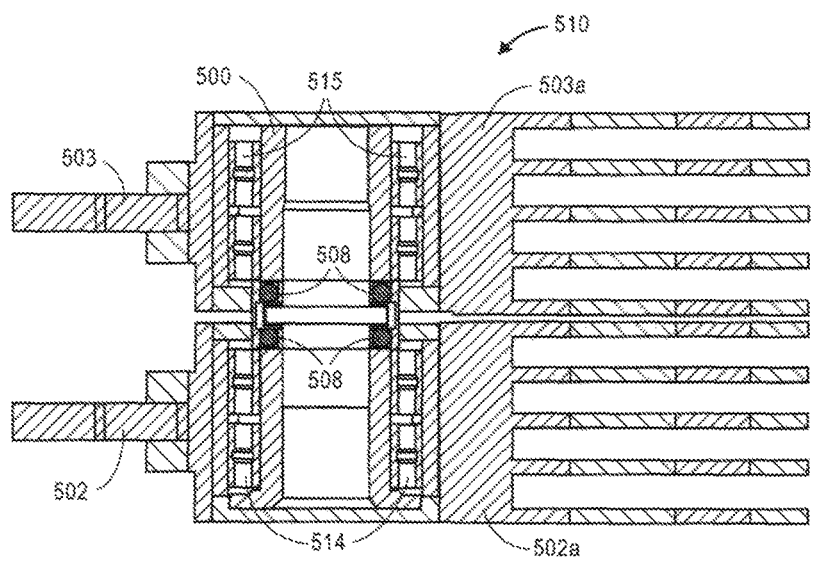
FIG. 5B is a cross-sectional side view illustrating the shared shaft of FIG. 5A with dual actuators assembled thereon, according to an embodiment.

FIG. 5A is a cross-sectional side view illustrating a shared shaft, and FIG. 5B is a cross-sectional side view illustrating the shared shaft of FIG. 5A with dual actuators assembled thereon, according to embodiments. Similar to shaft 200 (FIGS. 2A, 2B), pivot shaft assembly 500 (or "shaft assembly 500") comprises a shaft 501 having a bore there through, and at least one annular groove 504 extending radially inward from an outer surface 506. For example, each annular groove 504 may be machined, cut or cast into the structure, or wall, of the shaft 501. FIG. 5A depicts shaft 501 with two exemplary annular grooves 504 however, the number of annular groove(s) 504 may vary from implementation to implementation. According to embodiments, one or more of the annular grooves 504 may circumscribe a portion of an outer perimeter of the shaft 501, and/or one or more of the annular grooves 504 may circumscribe the entire outer perimeter of the shaft 501, i.e., such an annular groove 504 machined into the structure of the shaft 501 all the way around the outer diameter or perimeter of the shaft 501.

Furthermore, a shaft such as shaft 501 may comprise a plurality of annular grooves 504 and an annular groove 505 that extends radially outward from an inner surface 507 of the shaft 501, and may circumscribe a portion of or the entire inner perimeter of the shaft 501, such as an annular groove 505 machined from the inner surface 507 into the structure of the shaft 501. As depicted in FIG. 5A, each radially outward annular groove 505 may be positioned between radially inward annular grooves 504 (or pairs of annular grooves 504 such as with shaft assembly 400 of FIG. 4A).

According to an embodiment, and as depicted in FIG. 5B, at least one, or possibly each, annular groove 504 is substantially filled with an elastomeric damper 508 positioned within or fitted therein, such as an O-ring positioned or fitted within one or more annular groove 504. As before, an appropriate elastomer may be selected based on, for non-limiting examples, desired damping characteristics over a desired frequency range and temperature range, cleanliness requirements, elasticity, and the like. Additionally, and according to an embodiment, implementations of a shaft assembly 500 may further comprise a lower bearing 514 having an inner race attached to the outer surface 506 of the shaft 501 at a first location, and/or an upper bearing 515 having an inner race attached to the outer surface 506 of the shaft 501 at a second location, depending on a desired manufacturing process associated with assembling a dual-actuator, shared shaft assembly.

According to an embodiment, shaft assembly 500 further comprises an annular spacer 509 positioned over, around the shaft 501. Spacer 509 may assist with containing and mitigating the egress of contaminants from the annular groove 504/elastomeric damper 508 area of the shaft assembly 500, in particular, and from the hub area of the dual-actuator, shared shaft assembly, more generally. As depicted, and according to an embodiment, the spacer 509 is structurally configured with a non-constant cross-sectional area, such that the spacer 509 is thinner in an area, thereby further reducing the stiffness of the spacer 509 in comparison with a spacer having a constant cross-sectional area, e.g., spacer 409 of FIGS. 4A, 4B. Stated otherwise, spacer 509 has a top and a bottom and is configured with a first thickness 509a at a first location(s) between the top and bottom and a second different thickness 509b at a second location(s) between the top and bottom.

With reference to FIG. 5B and according to an embodiment, the shaft assembly 500 (FIG. 5A) is utilized as a pivot shaft, or part of a pivot shaft assembly, for multiple actuators constituent to a multi-actuator, shared shaft data storage device such as a hard disk drive (HDD). As such, a multi-actuator, shared shaft actuator assembly 510 (or "dual-actuator assembly 510") of FIG. 5B comprises the shaft assembly 500, around which a first or lower rotary actuator 502 (including a carriage 502a, such as carriage 134 of FIG. 1) is rotatably coupled at a first location of the shaft 501, with the lower bearing 514 interposed therebetween, and around which a second upper rotary actuator 503 (including a carriage 503a, such as carriage 134 of FIG. 1) is rotatably coupled at a second location of shaft 501, with the upper bearing 515 interposed therebetween. As depicted in FIGS. 5A, 5B, spacer 509 is positioned between the lower and upper bearings 514, 515. With reference to FIG. 5B, the spacer 509 is likewise positioned between the lower and upper actuators 502, 503 of the dual-actuator assembly 510.

Figure 6A:
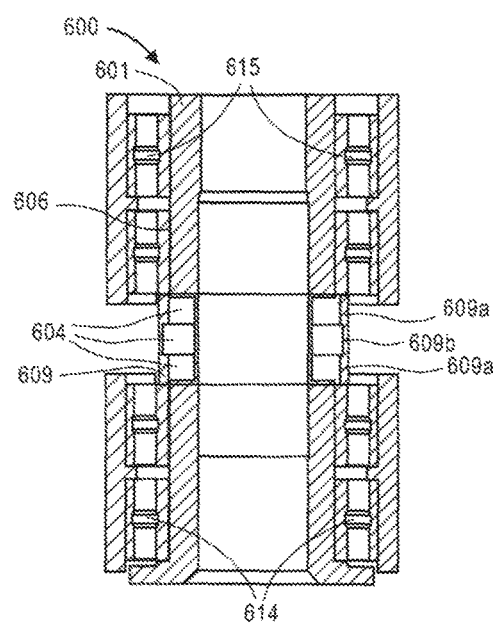
FIG. 6A is a cross-sectional side view illustrating a shared shaft, according to an embodiment.
Figure 6B:
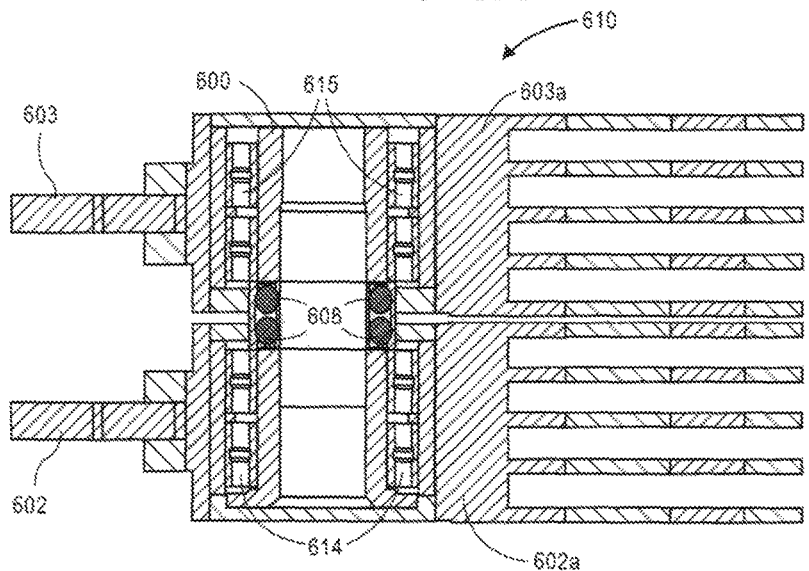
FIG. 6B is a cross-sectional side view illustrating the shared shaft of FIG. 6A with dual actuators assembled thereon, according to an embodiment.

FIG. 6A is a cross-sectional side view illustrating a shared shaft, and FIG. 6B is a cross-sectional side view illustrating the shared shaft of FIG. 6A with dual actuators assembled thereon, according to embodiments. Pivot shaft assembly 600 (or "shaft assembly 600") comprises a shaft 601 having a bore at least partially therethrough, and at least one annular groove 604 extending radially inward from an outer surface 606. For example, each annular groove 604 may be machined, cut or cast into the structure, or wall, of the shaft 601. According to embodiments, one or more of the annular grooves 604 may circumscribe a portion of an outer perimeter of the shaft 601, and/or one or more of the annular grooves 604 may circumscribe the entire outer perimeter of the shaft 601, i.e., such an annular groove 604 machined into the structure of the shaft 601 all the way around the outer diameter or perimeter of the shaft 601.

According to an embodiment, and as depicted in FIG. 6B, at least some of the volumetric space in the shaft 601 created by the annular groove 604 is substantially filled with at least one elastomeric damper 608 positioned within or fitted therein, such as an O-ring positioned or fitted within the annular groove 604 space. As before, an appropriate elastomer may be selected based on, for non-limiting examples, desired damping characteristics over a desired frequency range and temperature range, cleanliness requirements, elastic moduli, and the like. Different from shaft 501, shaft 601 lacks an annular groove such as annular groove 505 that extends radially outward from an inner surface 507 of the shaft 501. Hence, multiple elastomeric dampers 608 can be stacked (as depicted in FIG. 6B) to fill a lot of the volumetric space created by the annular groove 604, according to an embodiment. Such a configuration may provide additional frictional damping at the interface between the multiple elastomeric dampers 608 that are in contact with each other, whereby such friction may in turn transform vibrational energy to dissipative heat energy. Alternatively, according to an embodiment, a single taller/thicker elastomeric damper 608 can be utilized to fill a lot of the volumetric space created by the annular groove 604. Regardless, manufacturing machining complexity may be lessened with the configuration of shaft 601 as compared with shaft 501, because of the absence of an outward extending annular groove.

As with shaft 500, and according to an embodiment, implementations of a shaft assembly 600 may further comprise a lower bearing 614 having an inner race attached to the outer surface 606 of the shaft 601 at a first location, and/or an upper bearing 615 having an inner race attached to the outer surface 606 of the shaft 601 at a second location, depending on a desired manufacturing process associated with assembling a dual-actuator, shared shaft assembly. According to an embodiment, shaft assembly 600 further comprises an annular spacer 609 positioned over, around the shaft 601. As depicted, and according to an embodiment, the spacer 609 is structurally configured with a non-constant cross-sectional area, such that the spacer 609 is thinner in an area, thereby further reducing the stiffness of the spacer 609 in comparison with a spacer having a constant cross-sectional area, e.g., spacer 409 of FIGS. 4A, 4B.

With reference to FIG. 6B and according to an embodiment, the shaft assembly 600 (FIG. 6A) is utilized as a pivot shaft, or part of a pivot shaft assembly, for multiple actuators constituent to a multi-actuator, shared shaft data storage device such as a hard disk drive (HDD). As such, a multi-actuator, shared shaft actuator assembly 610 (or "dual-actuator assembly 610") of FIG. 6B comprises the shaft assembly 600, around which a first or lower rotary actuator 602 (including a carriage 602a, such as carriage 134 of FIG. 1) is rotatably coupled at a first location of the shaft 601, with the lower bearing 614 interposed therebetween, and around which a second upper rotary actuator 603 (including a carriage 603a, such as carriage 134 of FIG. 1) is rotatably coupled at a second location of shaft 601, with the upper bearing 615 interposed therebetween. As depicted in FIGS. 6A, 6B, spacer 609 is positioned between the lower and upper bearings 614, 615. With reference to FIG. 6B, the spacer 609 is likewise positioned between the lower and upper actuators 602, 603 of the dual-actuator assembly 610.

Method for Inhibiting Transmission of Vibration in a Data Storage Device

Figure 7:
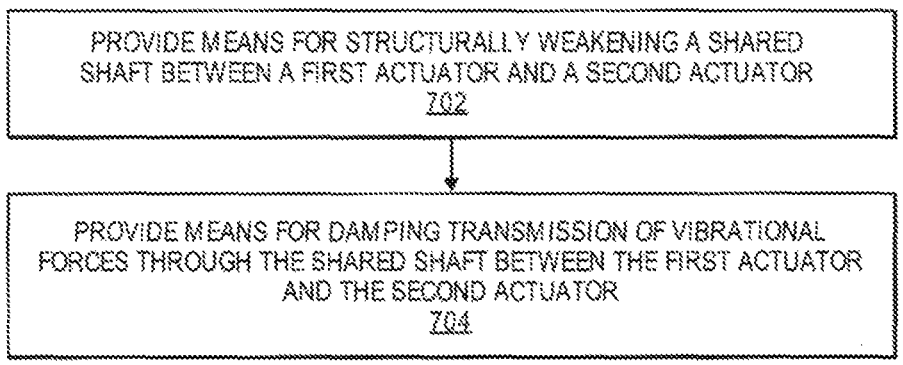
FIG. 7 is a flow diagram illustrating a method for inhibiting transmission of vibration, according to an embodiment.

FIG. 7 is a flow diagram illustrating a method for inhibiting transmission of vibration, according to an embodiment. For example, the method of FIG. 7 could be employed in a dual-actuator, shared shaft hard disk drive (HDD) having a first actuator and a second actuator, such as illustrated and described in reference to FIGS. 3A, 3B, 4B, 5B, 6B.

At block 702, means are provided for structurally weakening the shared shaft between the first actuator and the second actuator. For example, means illustrated and described in reference to FIGS. 2A-6B may be utilized to weaken each respective shared shaft between the associated actuators, in order to inhibit the transmission of vibration between the actuators during operation, for example.

At block 704, means are provided for damping transmission of vibrational energy through the shared shaft between the first actuator and the second actuator. For example, means illustrated and described in reference to FIGS. 2A-6B may be utilized to damp vibrational energy transmitted through each respective shared shaft between the associated actuators, in order to inhibit the transmission of vibration between the actuators during operation, for example.

EXTENSIONS AND ALTERNATIVES

While embodiments, techniques and approaches are described herein throughout in the context of a dual-actuator system, it is contemplated and one can appreciate that these embodiments, techniques and approaches may be similarly applied to and implemented in multi-actuator systems, generally. That is, the number of actuators or actuator assemblies in a multi-actuator system in which the described embodiments, techniques and approaches may be implemented is not limited to two.

In the foregoing description, embodiments of the invention have been described with reference to numerous specific details that may vary from implementation to implementation. Therefore, various modifications and changes may be made thereto without departing from the broader spirit and scope of the embodiments. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

In addition, in this description certain process steps may be set forth in a particular order, and alphabetic and alphanumeric labels may be used to identify certain steps. Unless specifically stated in the description, embodiments are not necessarily limited to any particular order of carrying out such steps. In particular, the labels are used merely for convenient identification of steps, and are not intended to specify or require a particular order of carrying out such steps.

What is claimed is:

1. A data storage device comprising:
a plurality of recording disk media rotatably mounted on a spindle;
a first head slider comprising a read-write transducer configured to read from and to write to one disk media of said plurality of disk media;
a first rotary actuator comprising a first bearing assembly and configured to move said first head slider to access portions of said one disk media;
a second head slider comprising a read-write transducer configured to read from and to write to another disk media of said plurality of disk media;
a second rotary actuator comprising a second bearing assembly and configured to move said second head slider to access portions of said another disk media; and
a shaft around which said first rotary actuator is rotatably coupled at a first location of said shaft and said second rotary actuator is rotatably coupled at a second location of said shaft, wherein said shaft comprises at least one annular groove circumscribing at least a portion of an outer perimeter of said shaft at an interface of said first location and said second location outside of respective areas of said shaft at which said first and second and any other bearing assemblies are positioned.

2. The data storage device of claim 1, wherein said at least one annular groove circumscribes the entire outer perimeter of said shaft.

3. The data storage device of claim 1, further comprising an elastomeric damper positioned within said at least one annular groove.

4. The data storage device of claim 3, wherein said elastomeric damper comprises an O-ring substantially filling said at least one annular groove.

5. The data storage device of claim 1, wherein said at least one annular groove comprises a plurality of annular grooves.

6. The data storage device of claim 1, wherein said shaft further comprises:
an axial bore therethrough; and
at least one annular groove circumscribing at least a portion of an inner perimeter of said shaft between a first of said at least one annular groove and a second of said at least one annular groove.

7. The data storage device of claim 6, further comprising a spacer positioned around said shaft between said first and second locations, wherein said spacer comprises a top and a bottom and is configured with a first thickness at a first location between said top and said bottom and a second different thickness at a second location between said top and said bottom.

8. The data storage device of claim 7, wherein said first location between said top and said bottom of said spacer corresponds with said at least one annular groove circumscribing said outer perimeter of said shaft and said second location between said top and said bottom of said spacer corresponds with said at least one annular groove circumscribing said inner perimeter of said shaft.

9. The data storage device of claim 1, further comprising a spacer positioned around said shaft between said first and second locations and radially outboard of said at least one annular groove.

10. The data storage device of claim 9, wherein said spacer comprises a top and a bottom and is configured with a substantially constant thickness between said top and said bottom.

11. The data storage device of claim 9, wherein said spacer comprises a top and a bottom and is configured with a first thickness at a first location between said top and said bottom and a second different thickness at a second location between said top and said bottom.

12. The data storage device of claim 1, wherein said at least one annular groove circumscribes only a portion of said outer perimeter of said shaft.

13. The data storage device of claim 1, wherein:
said first rotary actuator is a lower rotary actuator;
said second rotary actuator is an upper rotary actuator; and
said shaft comprises a first annular groove of said at least one annular groove circumscribing at least a portion of an outer perimeter of said shaft at a first location near a top portion of said lower rotary actuator and a second annular groove of said at least one annular groove circumscribing at least a portion of said outer perimeter of said shaft at a second location near a bottom portion of said upper rotary actuator.

14. A hard disk drive actuator pivot shaft assembly comprising:
a plurality of first annular grooves extending radially inward from an outer surface of a pivot shaft; and
a second annular groove extending radially outward from an inner surface of said pivot shaft and positioned between two of said plurality of first annular grooves.

15. The hard disk drive actuator pivot shaft assembly of claim 14, further comprising:
an elastomeric O-ring positioned within at least one of said plurality of first annular grooves.

16. The hard disk drive actuator pivot shaft assembly of claim 14, further comprising:
an elastomeric O-ring positioned within each of said plurality of first annular grooves.

17. The hard disk drive actuator pivot shaft assembly of claim 14, further comprising:
a lower bearing assembly having an inner race attached to said outer surface of said pivot shaft; and
an upper bearing assembly having an inner race attached to said outer surface of said pivot shaft.

18. A hard disk drive comprising the actuator pivot shaft assembly of claim 14.

19. A data storage device comprising:
a plurality of recording disk media rotatably mounted on a spindle;
a first head slider comprising a read-write transducer configured to read from and to write to one disk media of said plurality of disk media;
a first rotary actuator configured to move said first head slider to access portions of said one disk media;
a second head slider comprising a read-write transducer configured to read from and to write to another disk media of said plurality of disk media;
a second rotary actuator configured to move said second head slider to access portions of said another disk media; and
a shaft around which said first rotary actuator is rotatably coupled at a first location of said shaft and said second rotary actuator is rotatably coupled at a second location of said shaft, wherein said shaft comprises:
an axial bore therethrough,
a first annular groove circumscribing at least a portion of an outer perimeter of said shaft at an interface of said first location and said second location,
a second annular groove circumscribing at least a portion of an outer perimeter of said shaft at an interface of said first location and said second location, and
at least one annular groove circumscribing at least a portion of an inner perimeter of said shaft between said first annular groove and said second annular groove.

20. A data storage device comprising:
a plurality of recording disk media rotatably mounted on a spindle;
a first head slider comprising a read-write transducer configured to read from and to write to one disk media of said plurality of disk media;
a first rotary actuator configured to move said first head slider to access portions of said one disk media;
a second head slider comprising a read-write transducer configured to read from and to write to another disk media of said plurality of disk media;
a second rotary actuator configured to move said second head slider to access portions of said another disk media; and
a shaft around which said first rotary actuator is rotatably coupled at a first location of said shaft and said second rotary actuator is rotatably coupled at a second location of said shaft, wherein said shaft comprises at least one annular groove circumscribing only a portion of an outer perimeter of said shaft at an interface of said first location and said second location.

* * * * *